United States Patent [19]

Zouzoulas

[11] 4,328,885
[45] May 11, 1982

[54] ACTUATOR ACTIVATED SWITCHING MECHANISM

[75] Inventor: John Zouzoulas, Williamsville, N.Y.

[73] Assignee: Andco Actuator Products, Inc., Buffalo, N.Y.

[21] Appl. No.: 122,849

[22] Filed: Feb. 20, 1980

Related U.S. Application Data

[63] Continuation-in-part of Ser. No. 100,281, Dec. 5, 1979.

[51] Int. Cl.³ .............................................. F16D 71/00
[52] U.S. Cl. .................................. 192/142 R; 74/435; 192/139; 192/143; 200/47
[58] Field of Search ................ 192/142 R, 143, 116.5, 192/139; 200/47; 318/470, 467; 74/665 B, 405, 435

[56] References Cited

U.S. PATENT DOCUMENTS

| 2,091,371 | 8/1937 | McMaster | 74/405 X |
|---|---|---|---|
| 2,391,702 | 12/1945 | Hill | 192/142 R |
| 2,418,351 | 4/1947 | Jackson | 192/142 R |
| 2,501,613 | 3/1950 | Pethes | 74/405 |
| 2,541,360 | 2/1951 | Hull | 74/405 |
| 2,854,113 | 9/1958 | Hallden | 192/143 X |
| 2,854,855 | 10/1958 | Dudley | 74/405 |
| 2,973,659 | 3/1961 | Gallagher | 74/405 |
| 3,039,317 | 6/1962 | Wilson | 74/11 |
| 3,180,168 | 4/1965 | Harris | 74/405 |
| 3,257,535 | 6/1966 | Sallin et al. | 200/156 |
| 3,268,677 | 8/1966 | Schembera | 200/38 |
| 3,333,477 | 8/1967 | Denkowski | 192/139 X |
| 3,463,891 | 8/1969 | Fry | 200/47 |
| 3,480,746 | 11/1969 | Fry | 192/142 R X |
| 3,548,672 | 12/1970 | Conrad | 74/405 |
| 3,610,847 | 10/1971 | Houpt et al. | 200/38 R |
| 3,612,789 | 10/1971 | Marquis et al. | 200/17 R |
| 3,814,309 | 6/1974 | Ramstetter | 235/130 R |
| 3,830,993 | 8/1974 | Schulze-Berge | 200/35 R |
| 4,022,309 | 5/1977 | Denkowski et al. | 192/48.5 |
| 4,238,021 | 12/1980 | Lindner | 192/143 X |

FOREIGN PATENT DOCUMENTS 1138389 1/1969 United Kingdom .
1552565 9/1979 United Kingdom .

*Primary Examiner*—Rodney H. Bonck
*Attorney, Agent, or Firm*—LeBlanc, Nolan, Shur & Nies

[57] ABSTRACT

A switching mechanism can be utilized in conjunction with an electrically driven actuator, for example, either a linear or rotary operated actuator. The switching mechanism can be utilized to either control the extent of operation of the actuator, thereby operating as a limit switch, and also can be used for controlling other electrical devices that are to be operated in dependence upon the position of the driven member of the actuator. For this purpose, the switching mechanism is provided with a plurality of electrical switches, each of which can be controlled so as to be switched at different points in the operation of the actuator. Associated with each of the electrical switches is a separate counting mechanism. All the counting mechanisms are driven by a common drive gear which is coupled to the drive mechanism of the actuator. Each of the counting mechanisms can be independently preset for activating the corresponding switch after a different number of turns of the common drive gear, with the number of turns being correlated with the position of the actuator.

21 Claims, 10 Drawing Figures

ACTUATOR ACTIVATED SWITCHING MECHANISM

RELATED APPLICATION

The present application is a continuation-in-part of U.S. Patent application Ser. No. 100,281, entitled Linear Actuator, filed Dec. 5, 1979, the subject matter of which is hereby incorporated by reference.

BACKGROUND OF THE INVENTION

The present invention relates to switching mechanisms, such as limit switches for electrically driven actuators, either linear or rotary actuators.

Such actuators are typically utilized whenever either a thrust force or a torsional force needs to be applied. Examples of the utilization of such actuators is in the operation of lever arms, cranks, slides, flap valves, gate valve, globe valve, damper, etc. Such actuators are utilized for alternatively moving or rotating objects between predetermined positions. Exemplary of the type of actuators in which the limit switch of the present application can be utilized are the actuators shown in parent application Ser. No. 100,281 and rotary actuators such as shown in U.S. Pat. No. 4,022,309 (the subject matter of such patent is hereby incorporated by reference). In operating such actuators, limit switches have typically been utilized for either turning off the actuator when it has reached a certain predetermined position or for controlling the operation of associated equipment in dependence upon the position of the actuator. For this purpose, a plurality of switches are included within the switching mechanism which is coupled to the actuator.

It has been common with such limit switches to utilize a single drive gear that is coupled to the actuator through an appropriate set of gears. Each of the switches is coupled to the drive gear through a corresponding one of a plurality of planetary gears that surrounds the drive gear. In order to set the switches, the drive gear has been moved out of engagement with all of the surrounding planetary gears, each of which planetary gears serves to operate one of the switches. When the main drive gear is disengaged, all of the planetary gears are then free to rotate and be set. In order to enable all of the planetary gears and switches to be appropriately set, when the drive gear is disengaged, it is latched into the disengaged position and remains there until removed from such position.

Such a switching mechanism as that described above exhibits several drawbacks which can lead to a malfunctioning of the system. First, since the drive gear is latched into its disengaged position and must be unlatched and removed from such position for the switch mechanism to operate, often during the utilization of the actuator and the limit switch, the operator will fail to remove the drive gear from its disengaged position and hence the limit switch remains inoperative. In addition, since all of the planetary gears are free to rotate when the drive gear is disengaged, it is possible for several of the planetary gears to accidently rotate and thereby be improperly set for actuation at the wrong time.

A plurality of different types of control mechanisms for actuating the switch in dependence upon the position of a set of gears are shown in the prior art. Typically, such mechanisms are part of various timing mechanisms. Illustrative of such control timers are those embodiments shown in U.S. Pat. Nos.: 2,854,855 to Dudley; 2,973,659 to Gallagher et al.; 3,180,168 to Harris; 3,268,677 to Schembera; 3,610,847 to Houpt; and 3,612,789 to Marquis et al.

SUMMARY OF THE INVENTION

An object of the present invention is to provide an improved switching mechanism for utilization with an electrically driven actuator, such as a linear or rotary actuator.

Another object of the present invention is to provide a switching mechanism for utilization in conjunction with an electrically driven actuator where the switching mechanism includes a plurality of switches each of which can be independently and separately set for actuation during different points of the operation of the actuator.

A further object of the present invention is to provide a switching mechanism having a plurality of switches each of which is simultaneously driven by a common driving gear which is coupled to each switch through a separate corresponding planetary gear and each planetary gear is capable of being independently disengaged from the drive gear for setting of the associated switch.

Still another object of the present invention is to provide an improved switching mechanism having a plurality of switches, each being capable of being independently set without disengaging any of the other switches from the drive mechanism.

A still further object of the present invention is to provide a switching mechanism in which each of the switches can be independently and separately set so as to be actuated at different times where the planetary gear for driving each switch is disengaged from the main driving gear during the setting operation and is automatically returned to a driving position after setting of the switch.

The above objectives are achieved with the utilization of the switching mechanism of the present invention. The switching mechanism is coupled to the actuator through a coupling gear arrangement which is connected to the actuator. The switching mechanism includes a plurality of electrical switches, each of which can be set for being actuated at different points during the operation of the actuator. A drive gear is coupled between the coupling gear and the switches for mechanically operating each of the switches in dependence upon the movement of the actuator. A plurality of planetary gears are arranged so as to surround and be in engagement with the drive gear so as to rotate in conjunction with the drive gear. Each of the planetary gears serves to operate one of the switches. Associated with each of the planetary gears and the corresponding switch is a counter. Each counter is connected between the planetary gear and the switch and serves to turn the associated switch on or off after a certain number of revolutions of the drive gear. All of the planetary gears are spring biased so as to be normally in engagement with the drive gear. Each of the planetary gears, however, can be individually disengaged from the drive gear one at a time and rotated for advancing the associated counter a preselected number of turns for setting the counter so that it actuates the associated switch after a predetermined number of turns of the drive gear. After the counter and the associated switch have been set, the planetary gear is automatically returned to its normal position in engagement with the drive gear.

Each of the counters includes a plurality of intermittent gears, which intermittent gears are interconnected so that for each revolution of the intermittent gear closest to the respective planetary gear, the next adjacent intermittent gear will only rotate a portion of a revolution. Typically, each of the intermittent gear will include three sets of intermittent gears. The sets of intermittent gears are constructed so that 100 revolutions of the first gear set will cause 10 revolutions of a second gear set which in turn will cause 1 revolution of the third gear set. Each revolution of the third gear set will switch the associates switch either on or off. Thus, the intermittent gear set and the corresponding switch can be preset by advancing the first gear set X turns so that the associated switch will be activated when the drive gear rotates 100−X revolutions.

The mechanism for disengaging the planetary gear from the drive gear includes a spring biased shaft on which the planetary gear is mounted for rotation. The spring biased shaft is normally biased into a position for the planetary gear to engage the drive gear. By applying a manual force for moving the shaft along a direction parallel to the axis of rotation of the planetary gear, the planetary gear can be disengaged from the drive gear and rotated for setting the counter. A guide member serves to guide the shaft and the associated planetary gear for movement along the axis of rotation of the planetary gear for enabling it to be disengaged from the drive gear. A spring is arranged for biasing the shaft and the planetary gear into their normal position. The force of the spring is overcome by the application of a manually applied force and once the planetary gear disengages from the drive gear, the planetary gear and the intermittent gear sets can be freely rotated for setting the counter. Upon release of the manually applied force, the spring automatically returns the shaft and the planetary gear to their normal position.

DESCRIPTION OF THE PREFERRED EMBODIMENTS

Figure 1:
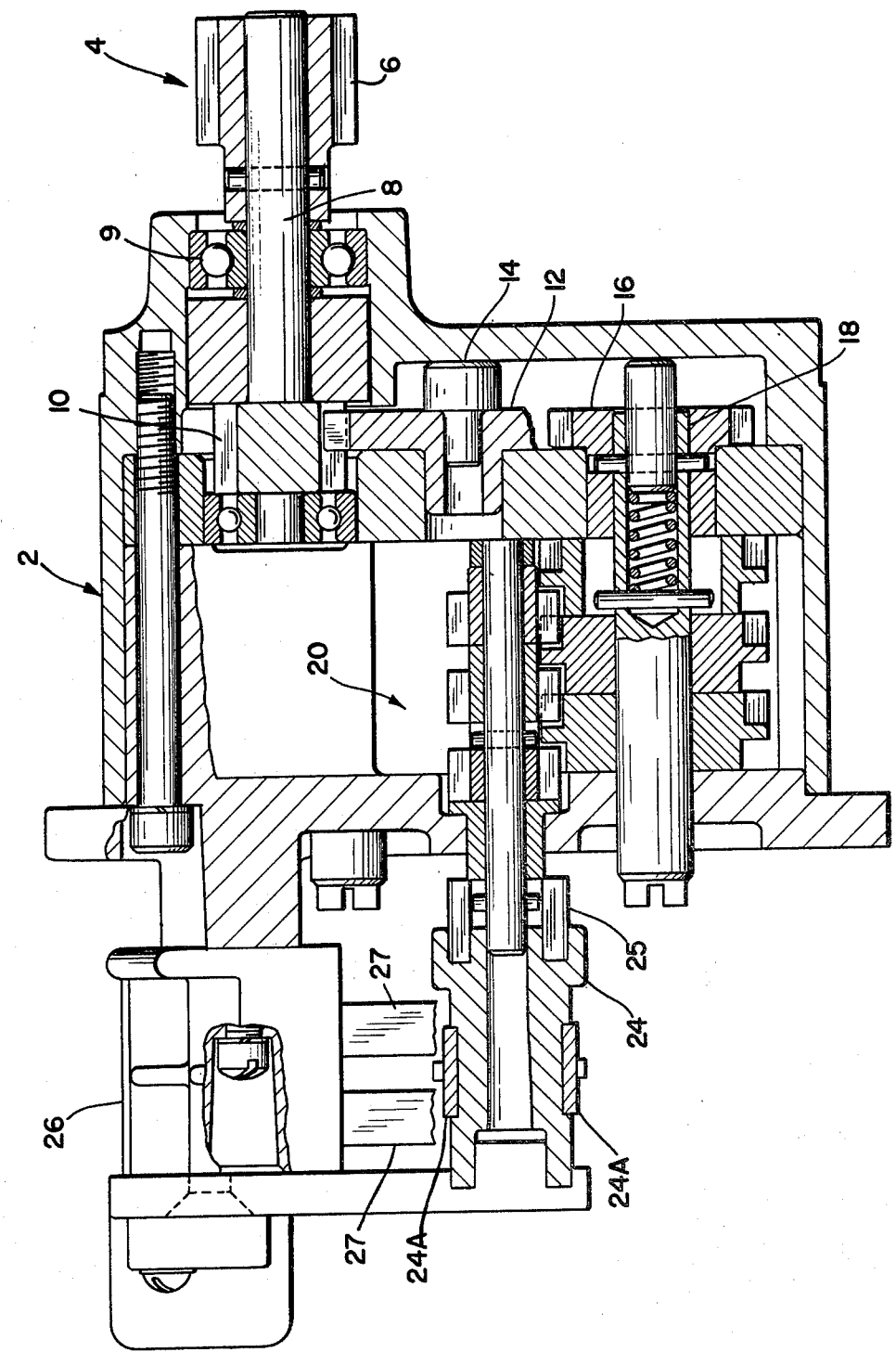
FIG. 1 is a side elevational sectional view of the switching mechanism of the present invention.

A limit switch mechanism 2 for an actuator is illustrated in FIG. 1. Since the switching mechanism is shown in a partial sectional view, for the sake of clarity only one of the switches and the associated gear arrangement are illustrated. In a typical switching mechanism, however, there would be a plurality of switches, normally four. The reference here to a switch is utilized for designating each switch attached to a respective gear arrangement, including the planetary gear and intermittent gear sets. In reality, more than one switch could be coupled to and operated by each planetary gear and intermittent gear set and each switch so associated would be rotated simultaneously and operated in conjunction with each other. Such an arrangement of a plurality of switches in association with each planetary gear and intermittent gear set merely enables additional electrical devices to be operated by the switching mechanism.

Switching mechanism 2 is coupled to the actuator by a coupling mechanism 4. Coupling mechanism 4 includes an actuator coupling gear 6 mounted on a coupling rod 8 which is secured to switching mechanism 2 and rotatable within bearings 9. Coupling rod 8 is connected and rotates coupling drive gear 10 which in turn rotates drive, or sun, gear 12. Coupling gear 6 can be arranged so as to extend into the housing of the actuator and the actuator is provided with a corresponding gear for driving coupling gear 6 in dependence upon the movement of the actuator. Thus, rotation of the drive mechanism and the associated gear for connection to the switching mechanism will rotate coupling gear 6 and hence coupling drive gear 10 which in turn will cause rotation of sun gear 12.

Sun gear 12 is mounted on shaft 14 so as to rotate with such shaft. Surrounding sun gear 12 are a plurality of planetary gears 16, each of which is arranged so as to rotate about a fixed axis.

Each planetary gear is mounted on and rotates with shaft 18, which is a hollow cylinder. Rotation of planetary gear 16 and shaft 18 in turn causes rotation of the intermittent gears that form the counting mechanism 20. As the counting mechanism rotates, rotation of the final gear of such mechanism in turn will rotate coupling member 25 and switch rotor member 24. Rotor member 24 has two electrical contacts 24A secured and positioned 180° apart on the circumference of the rotor 24. Contact fingers 27 are connected to the electric circuit. Rotor contacts 24A and contact fingers 27 are shown so as the electrical circuit has been interrupted. Rotation of rotor 24 by one quarter of a turn (90°) will move one of the rotor contacts 24A–depending on the direction of rotation–in contact with fingers 27 thus making the electric circuit.

Figure 2:
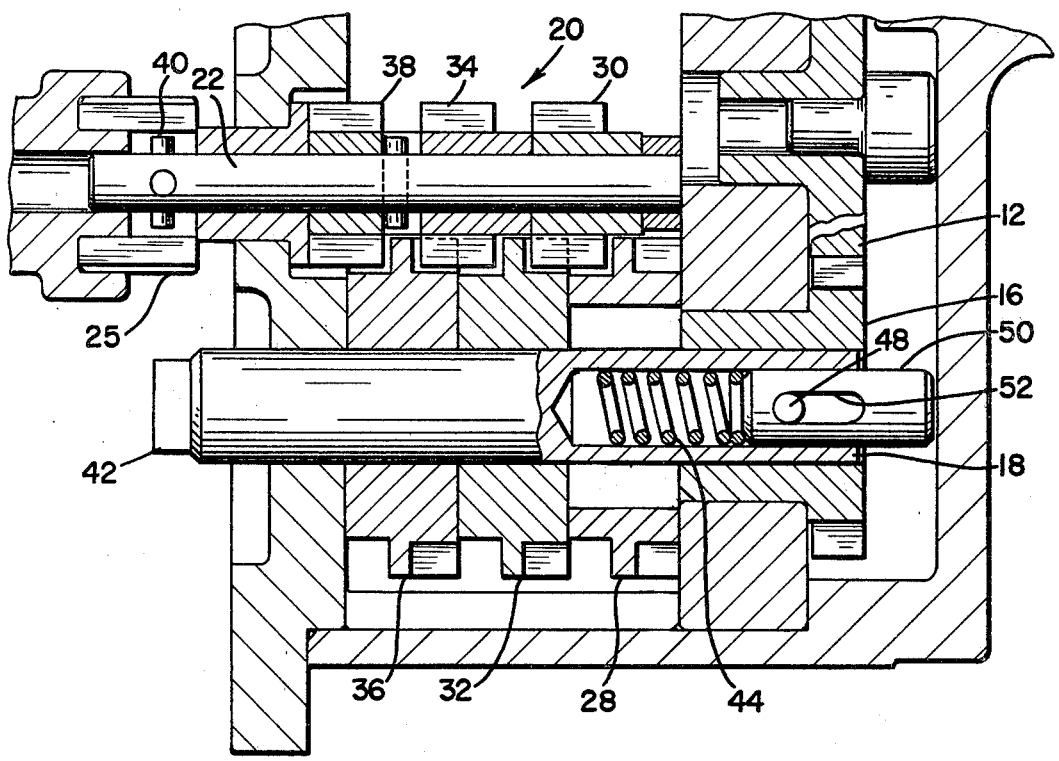
FIG. 2 is an enlarged view of a portion of the switching mechanism illustrated in FIG. 1 with the illustrated planetary gear being rotated by 90°.

The structure and the operation of the planetary gear and counting mechanism along with setting of the counting mechanism will be explained in greater detail with reference to FIG. 2. As shown in FIG. 2, gear 16 is secured to shaft 18 so as to rotate with the shaft. Connected to shaft 18 is a gear 28. Rotation of planetary gear 16 causes simultaneous and coordinated rotation of gear 28. Rotation of gear 28 in turn rotates intermittent pinion 30. Pinion 30 will then rotate gear 32. The rotation of the gears then will proceed through intermittent pinion 34, gear 36 and pinion 38.

Figure 3:
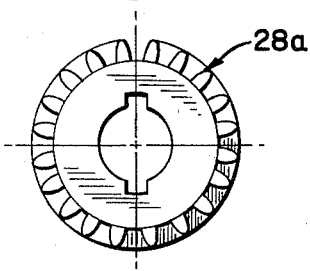
FIG. 3 is a front elevational view of one of the intermittent gears illustrated in FIG. 1.
Figure 4:
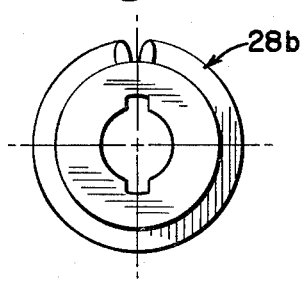
FIG. 4 is a rear elevational view of the intermittent gear illustrated in FIG. 3.
Figure 3A:
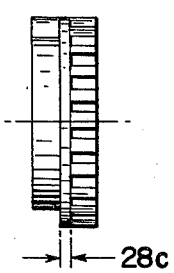
FIG. 3A is a side elevational view of the intermittent gear illustrated in FIG. 3.
Figure 7:
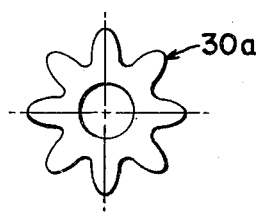
FIGS. 7 and 8 are elevational views of the rear and front faces, respectively, of one of the intermittent pinions illustrated in FIG. 1.
Figure 8:
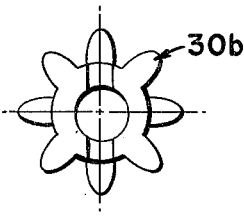
Figure 9:
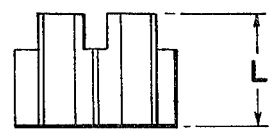
FIG. 9 is a side elevational view of the intermittent pinion illustrated in FIGS. 7 and 8.

In order to obtain a stepping arrangement between the gears, an arrangement so that pinion 30 will rotate a greater number of revolutions in response to the rotation of planetary gear 16 than the number of revolutions that gear 38 will rotate, intermittent gears are utilized. An illustration of the two faces of intermittent gear 28 are shown in FIGS. 3 and 4. In FIG. 3, face 28a of the intermittent gear 28 is illustrated. Face 28a has twenty teeth surrounding the entire circumference of the gear. In FIG. 4, face 28b of the intermittent gear 28 has only two teeth in line with corresponding teeth of face 28a on FIG. 3. Except for the two teeth as shown in FIG. 4, face 28b is separated from face 28A by rib 28C as shown in FIG. 3A. An illustration of the two faces of intermittent pinion 30 are shown in FIGS. 7 and 8. In FIG. 7, face 30A of the intermittent pinion 30 is illustrated. Face 30a has eight teeth surrounding the entire circumference of the pinion. In FIG. 8, face 30b of the intermittent pinion 30 is illustrated. Face 30b, has four (4) teeth spaced 90° apart and in line with corresponding teeth of face 30A. Four teeth of face 30a are extended through approximately one half of length L, illustrated in FIG. 9. Gear 28 is driven by planetary gear 16 through shaft 18 and pin 46 and rotates continuously.

Figure 5:
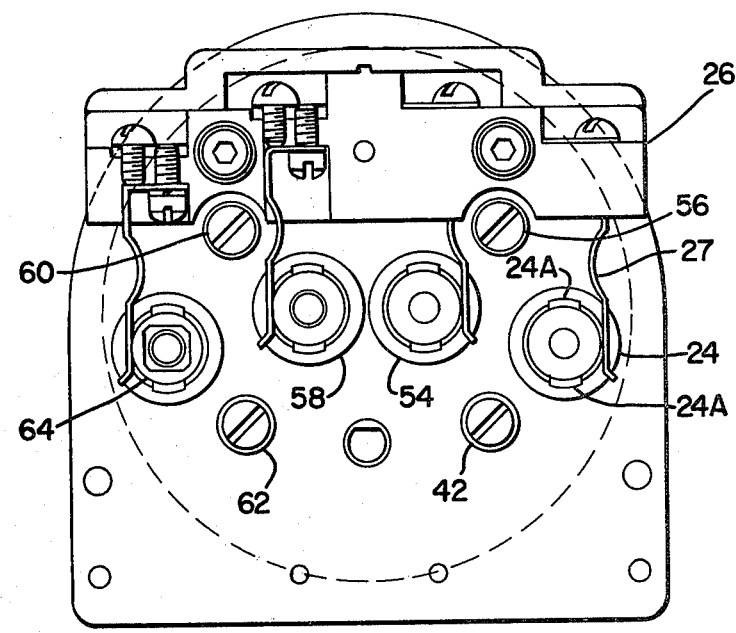
FIG. 5 is a rear elevational view of the switching mechanism illustrated in FIG. 1 with the rear cover plate removed.

For every revolution of intermittent gear 28, the two teeth of face 28B of gear 28 will mesh with one full tooth of intermittent pinion 30, so that intermittent pinion 30 will rotate one quarter of a revolution. In turn intermittent pinion 30 which is continuously meshed with the teeth on the front face (similar to face 28a) of intermittent gear 32 will cause gear 32 to rotate by two teeth or one tenth of a revolution. Hence one revolution of intermittent gear 32 will advance mating intermittent pinion 34 by two teeth or one quarter of a turn. Intermittent pinion 34 in turn will rotate intermittent gear 36 by two teeth or one tenth of a revolution. One revolution of intermittent gear 36 will rotate intermittent pinion 38 by two teeth or one quarter of a revolution. Since pinion 38 is pinned to drive shaft 22, it will rotate driver 25 through pin 40. Driver 25 is mechanically meshed with rotor 24 which will rotate and trip the switch to break or make the contact 24A with fingers 27 to interrupt or complete the electric circuit as illustrated in FIGS. 1 and 5.

Consequently, 100 revolutions of planetary gear 16 will cause 100 revolutions of intermittent gear 28 and only one quarter of a revolution of intermittent pinion 38. As will readily be appreciated, any other stepping arrangement between the gears or additional gears can be used so as to obtain a larger or smaller differential between the number of rotations of gear 16 and the revolutions of intermittent pinion 38. Each one quarter of a revolution of intermittent pinion 38 will in turn cause one quarter revolution of driver 25. For this purpose, intermittent pinion 38 can be secured to coupling rod 22 which in turn is secured to coupling driver 25 through pin 40.

In order to set the counter mechanism 20 so that switch 25 will be actuated after a preselected number of turns of planetary gear 16, planetary gear 16 and accordingly counting mechanism 20 can be advanced by a predetermined number of turns. Thus, if the switch is to be actuated after X revolutions of planetary gear 16 then in the embodiment shown in FIG. 2, planetary gear 16 and accordingly counting mechanism 20 will be advanced by 100-X revolutions. For example, if the switch is to be actuated after 10 revolutions of planetary gear 16, then planetary gear 16 can be advanced by 90 revolutions. Accordingly after 10 additional revolutions of planetary gear 16 switch 26 will then be actuated since 10 additional revolutions of planetary gear 16 will cause the completion of one quarter of a revolution of intermittent pinion 38 and driving member 25.

In order to set the counting mechanism, planetary gear 16 is disengaged from sun gear 12. For this purpose, shaft 18 is mounted on guide sleeve 50, which provides an axial path of movement for shaft 18. Shaft 18 is attached to a pin 46. By a biasing force created by a spring 44 between sleeve 50 and pin 46, shaft 18 and attached planetary gear 16 are biased so that planetary gear 16 in its normal position remains in engagement with sun gear 12.

By applying a force on set screw 42 in a direction along the axis of rotation of planetary gear 16, the force of spring 44 is overcome. As the force is applied, shaft 18 is moved in a forward direction and the shaft is guided along guide sleeve 50 by a pin 48 attached to shaft 18 which slides within a slot 52 in guide sleeve 50. As shaft 18 moves in a forward direction, planetary gear 16 is disengaged from sun gear 12. Once planetary gear 16 is disengaged from sun gear 12, it is free to rotate for advancing counting mechanism 20 the desired number of revolutions. Immediately upon removing the force from set screw 42, spring 44 returns shaft 18 and hence planetary gear 16 back to their normal positions where planetary gear 16 is in engagement with sun gear 12.

Figure 6:
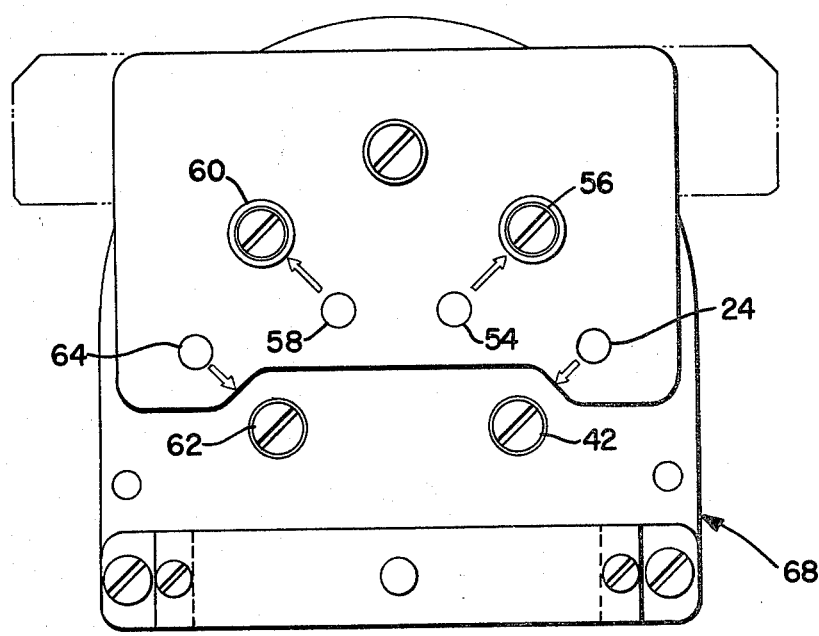
FIG. 6 is a rear elevational view of the switching mechanism illustrated in FIG. 1 with the cover plate in place.

As shown in FIGS. 5 and 6, the switching mechanism can include a plurality of switches with each switch having its own setting mechanism. Accordingly, the switch mechanism can include switches 24, 54, 58 and 64, with each having its own set screw 42, 56, 60 and 62, respectively, for setting the counting mechanism associated with such switch. As shown in FIG. 6, a cover plate 68 covers the rear end of the mechanism.

The present invention may be embodied in other specific forms without departing from the spirit or essential characteristics thereof. The present embodiment is presented merely as illustrative and not restrictive, with the scope of the invention being indicated by the attached claims rather than the foregoing description. All changes which come within the meaning and range of equivalency of the claims are therefore intended to be embraced therein.

What is claimed is:

1. A switching mechanism for operation in conjunction with an electrically driven actuator, said switching mechanism comprising:

coupling means for connecting said switching mechanism to the actuator;

a plurality of electrical switches;

a drive gear coupled between said coupling means and said switches for mechanically operating each of said switches in dependence upon the movement of the actuator;

a plurality of planetary gears arranged around and in engagement with said drive gear so as to rotate in conjunction with said drive gear;

a plurality of counting means, each of said counting means serving to couple one of said planetary gears to a respective one of said switches, each of said counting means being connected so as to turn the associated said switch on or off after a certain number of revolutions of said drive gear;

means for individually disengaging each of said planetary gears from said drive gear and rotating such planetary gear for advancing the associated said counting means a preselected number of turns so as to set said counting means for actuating its associated said switch after a predetermined number of turns of said drive gear; and, means for automatically returning each of said planetary gears to its position in engagement with said drive gear after the associated said counting means has been set.

2. A switching mechanism according to claim 1 wherein each of said counting means can be individually set for enabling each of said switches to be operated after a different number of revolutions of said drive gear.

3. A switching mechanism according to claim 2 wherein each of said counting means includes a plurality of intermittent gears, said intermittent gears being coupled so that for each revolution of the intermittent gear closest to the respective said planetary gear, the next adjacent intermittent gear will only rotate a portion of a revolution.

4. A switching mechanism according to claim 2 wherein each of said counting means includes three intermittent gears and three intermittent pinions, two of said intermittent pinions are arranged for coupling rotational movement of said intermittent gears and the third of said intermittent pinions is arranged for coupling rotational movement of the third said intermittent gear to the respective said switch, said intermittent gears and said intermittent pinions are constructed such that 100 revolutions of the first said intermittent gear will cause 10 revolutions of the second said intermittent gear and one revolution of the third said intermittent gear and each revolution of said third intermittent gear will switch the associated said switch, and said counting means can be preset by advancing said first intermittent gear X turns so that the associated said switch will be activated when said drive gear rotates 100−X revolutions.

5. A switching mechanism according to claim 1, 2, 3 or 4 wherein said means for disengaging each of said planetary gears includes: a shaft on which said planetary gear is mounted for rotation, means for providing an axial path of movement for said shaft in a direction parallel to the axis of rotation of said planetary gear, guide means for guiding said shaft and the associated and planetary gear for movement along the axis of rotation of said planetary gear for disengaging said planetary gear from said drive gear for enabling setting of said counting means and biasing means for normally biasing said shaft and said planetary gear into a position for said planetary gear to be in engagement with said drive gear.

6. A switching mechanism according to claim 5 wherein there are four switches, each independently settable for providing separate switching signals at different points of operation of the actuator.

7. A switching mechanism according to claim 5 wherein: said biasing means includes a spring arranged for biasing said shaft and said planetary gear into its normal position for said planetary gear to be engaged with said drive gear; said shaft is capable of being moved by application of a manually applied force against the biasing force of said spring for enabling rotation of said planetary gear and setting of said counting means; and, upon release of the force for moving said shaft for the setting of said counting means, said spring automatically returns said shaft and said planetary gear to their normal position.

8. A switching mechanism according to claim 7 wherein each of said planetary gears is mounted for rotation about its associated said shaft and has a pin associated therewith for coupling it to said shaft, said guide means has a slotted opening in which said pin extends for controlling the path and extent of axial movement of said shaft and correspondingly axial movement of said planetary gear.

9. A switching mechanism according to claim 4 wherein each of said intermittent gears has two intermittent gear faces with said first intermittent gear face having teeth around its entire circumference and said second intermittent gear face only having teeth around a portion of its circumference.

10. A switching mechanism according to claim 9 wherein said first intermittent gear face of said first intermittent gear is coupled to said planetary gear, said second intermittent gear face of said first intermittent gear is coupled to said first intermittent gear face of said second intermittent gear through one of said intermittent pinions, said second intermittent gear face of said second intermittent gear is coupled to said first intermittent gear face of said third intermittent gear through one of said intermittent pinions and said third intermittent gear is coupled to said switch through one of said intermittent pinions.

11. A linear actuator comprising:
an extendable member capable of being extended in a longitudinal direction from said actuator;
a drive mechanism for controlling movement of said extendable member; and,
a switching mechanism including:
coupling means for connecting said switching mechanism to said drive mechanism;
a plurality of electrical switches;
a drive gear coupled between said coupling means and said switches for mechanically operating each of said switches in dependence upon the movement of the actuator;
a plurality of planetary gears arranged around and in engagement with said drive gear so as to rotate in conjunction with said drive gear;
a plurality of counting means, each of said counting means serving to couple one of said planetary gears to a respective one of said switches, each of said counting means being connected so as to turn the associated said switch on or off after a certain number of revolutions of said drive gear;
means for individually disengaging each of said planetary gears from said drive gear and rotating such planetary gear for advancing the associated said counting means a preselected number of turns so as to set said counting means for actuating its associated said switch after a predetermined number of turns of said drive gear; and,
means for automatically returning each of said planetary gears to its position in engagement with said drive gear after the associated said counting means has been set.

12. A rotary actuator comprising:
a rotatable coupler for attachment to a member to be rotationally operated;
a drive mechanism for rotating said coupler; and,
a switching mechanism including:
coupling means for connecting said switching mechanism to said drive mechanism;
a plurality of electrical switches;
a drive gear coupled between said coupling means and said switches for mechanically operating each of said switches in dependence upon the movement of the actuator;
a plurality of planetary gears arranged around and in engagement with said drive gear so as to rotate in conjunction with said drive gear;
a plurality of counting means, each of said counting means serving to couple one of said planetary gears to a respective one of said switches, each of said counting means being connected so as to turn the associated said switch on or off after a certain number of rotations of said drive gear;

means for individually disengaging each of said planetary gears from said drive gear and rotating such planetary gear for advancing the associated said counting means a preselected number of turns so as to set said counting means for actuating its associated said switch after a predetermined number of turns of said drive gear; and, means for automatically returning each of said planetary gears to its position in engagement with said drive gear after the associated said counting means has been set.

13. An actuator according to claim 11 or 12 wherein each of said counting means can be individually set for enabling each of said switches to be operated after a different number of rotations of said drive gear.

14. An actuator according to claim 13 wherein each of said counting means includes a plurality of intermittent gears, said intermittent gears being coupled so that for each revolution of the intermittent gear closest to the respective said planetary gear, the next adjacent intermittent gear will only rotate a portion of a revolution.

15. An actuator according to claim 13 wherein each of said counting means includes three intermittent gears and three intermittent pinions, two of said intermittent pinions are arranged for coupling rotational movement of said intermittent gears and the third of said intermittent pinions is arranged for coupling rotational movement of the third said intermittent gear to the respective said switch, said intermittent gears and said intermittent pinions are constructed such that 100 revolutions of the first said intermittent gear will cause 10 revolutions of the second said intermittent gear and one revolution of the third said intermittent gear and each revolution of said third intermittent gear will switch the associated said switch, and said counting means can be preset by advancing said first intermittent gear X turns so that the associated said switch will be activated when said drive gear rotates 100−X revolutions.

16. An actuator according to claim 14 wherein said means for disengaging each of said planetary gears includes: a shaft on which said planetary gear is mounted for rotation, means for providing an axial path of movement for said shaft in a directional parallel to the axis of rotation of said planetary gear, guide means for guiding said shaft and the associated said planetary gear for movement along the axis of rotation of said planetary gear for disengaging said planetary gear from said drive gear for enabling setting of said counting means and biasing means for normally biasing said shaft and said planetary gear into a position for said planetary gear to be in engagement with said drive gear.

17. An actuator according to claim 16 wherein there are four switches, each independently settable for providing separate switching signals at different points of operation of the actuator.

18. An actuator according to claim 16 wherein: said biasing means includes a spring arranged for biasing said shaft and said planetary gear into its normal position for said planetary gear to be engaged with said drive gear; said shaft is capable of being moved by application of a manually applied force against the biasing force of said spring for enabling rotation of said planetary gear and setting of said counting means; and, upon release of the force for moving said shaft for the setting of said counting means, said spring automatically returns said shaft and said planetary gear to their normal position.

19. An actuator according to claim 18 wherein each of said planetary gears is mounted for rotation about its associated said shaft and has a pin associated therewith for coupling it to said shaft, said guide means has a slotted opening in which said pin extends for controlling the path and extent of axial movement of said shaft and correspondingly axial movement of said planetary gear.

20. An actuator according to claim 15 wherein each of intermittent gears includes first and second intermittent gear faces, said first intermittent gear face having teeth around its entire circumference and said second intermittent gear face only having teeth around a portion of its circumference.

21. An actuator according to claim 20 wherein each of said intermittent gears has two intermittent gear faces with said first intermittent gear face having teeth around its entire circumference and said second intermittent gear face only having teeth around a portion of its circumference.

* * * * *